United States Patent Office 3,465,066
Patented Sept. 2, 1969

3,465,066
PROCESS FOR THE PRODUCTION OF SHOCK
RESISTING POLYMERS
Atsushi Tanaka, Uenodai, Fukuoka, and Teizo Kudo, Iruma, Saitama, Japan, assignors to Daicel Ltd., Osaka, Japan, a corporation of Japan
No Drawing. Filed Aug. 1, 1966, Ser. No. 569,024
Claims priority, application Japan, July 31, 1965, 40/46,348
Int. Cl. C08f 19/16, 19/08, 41/10
U.S. Cl. 260—880    6 Claims

ABSTRACT OF THE DISCLOSURE

A process for the production of a high impact polymer in which a preliminary polymerization of a mixture of a rubbery conjugated 1,3-diene polymer and a polymerizable monomer comprising an aromatic monoalkenyl hydrocarbon monomer is carried out while the mixture is in a water-in-oil type dispersion state and, after the polymerization percentage reaches from about 10 to about 60 percent by weight based on the weight of the monomer, a suspension agent is added to the mixture in order to invert same into an oil-in-water type dispersion, following which the polymerization is completed in order to obtain the polymer in granular form.

---

The present invention relates to a novel improved process for the production of a polymer having a high impact resistance and an excellent molding characteristic, and more particularly it relates to a novel improved process for the production of an impact resisting polymer having an excellent molding characteristic and an improved surface quality, comprising a product obtained by the combination of vinyl monomers mainly consisting of at least one aromatic monoalkenyl monomer and a rubber elastomer.

Various kinds of high impact polymer products prepared using as the main components aromatic monoalkenyl monomers, such as, high impact polystyrene resins and acrylonitrile-butadiene-styrene resins (ABS resins) have been produced on a commercial scale. Such high impact resins can be prepared practically by a process wherein a butadient type rubber elastomer or rubber aqueous emulsion is dissolved or dispersed in an aromatic monoalkenyl monomer or a mixture of an aromatic monoalkenyl monomer and a polymerizable vinyl monomer, such as acrylonitrile, and the resulting solution or dispersion is subjected to bulk polymerization, solution polymerization, emulsion polymerization, suspension polymerization or a two-step polymerization consisting of a preliminary bulk polymerization and a final suspension polymerization, under the conditions which produce graft copolymers.

However, such conventional polymerization processes are generally accompanied with certain difficulties. For example, in the case of producing a high impact resistance polymer composition by a bulk polymerization process, the problem of the transfer and the removal of the polymerization heat from the reaction mixture is difficult because of the decreasing heat conductivity of the mixture as the reaction proceeds, more especially, as the viscosity of the reaction system increases, and accordingly it is very hard to control closely the reaction temperature. Further, in order to overcome these difficulties, considerable efforts have been made to plan a continuous polymerization procedure and the production apparatus therefor. By employing a solution polymerization process, the above-mentioned difficulties caused by relatively low heat transfer may be overcome to some extent but there are other drawbacks in that the solvent must be recovered from the reaction system after the polymerization is finished. In the case of employing an emulsion polymerization process, the above-mentioned difficulties may be overcome partially but this process is accompanied with another drawback. That is, there remains in the produced polymer an emulsifier used for maintaining the reaction system in an emulsion state or a salting-out agent used for separating the polymer product from the latex, which reduces remarkably the heat stability of the polymer, the transparency thereof, and/or the electric properties. A suspension polymerization process is very advantageous because of the ease of the polymerization procedure and the high purity of the polymer as compared with the above-mentioned processes. The suspension polymerization process can be employed for the production of the high impact polymers. However, the high impact polymers prepared by such a suspension polymerization process generally have good strength but articles molded therefrom have a low surface gloss. This is perhaps explained by the fact that the energy of agitation in the suspension polymerization procedure is used in order to form an oil-in-water type dispersion of droplets and maintaining such in a dispersed state. This agitation energy is not sufficiently utilized for mixing uniformly the polymer with the rubber component in the dispersion. Hence, a morphologically nonhomogeneous polymer composition is produced. Accordingly, in order to overcome this drawback, a so-called two-step polymerization process has been proposed, in which a preliminary bulk polymerization is carried out prior to the starting of the suspension polymerization. Further, it has been recommended to carry out the preliminary bulk polymerization and the suspension polymerization in the two-step polymerization process with different agitation speeds in each step. However, such a two-step polymerization process including the bulk polymerization step may be certainly an effective process in a small scale system, but it is not always profitable in the case of large scale production. That is control of the reaction is not always maintained easily, particularly as regards controlling the temperature in the preliminary bulk polymerization stage and reproducing the polymerization rate therein and, very expensive apparatuses as well as very complicated procedures may be required in this stage.

As mentioned above, there have never been provided improved processes capable of producing economically high impact polymers having very excellent qualities by the use of only one simple polymerization vessel. The inventors have studied the suspension polymerization process in order to overcome the above-mentioned difficulties, and as the result thereof, these purposes are accomplished by the novel process of this invention.

It is an object of this invention to provide a novel improved process for the production of a high impact resistance polymer having good molding characteristics and capable of providing an improved surface quality to the articles molded therefrom.

The above-mentioned object of this invention can be accomplished by the following process, wherein a rubber elastomer is dissolved in or added to an aromatic monoalkenyl monomer or a mixture of an aromatic monoalkenyl monomer and a polymerizable monovinyl monomer. The resulting solution or mixture is, if necessary with the addition of conventional additives, such as a polymerization catalyst and/or a transfer agent, mixed with water and then subjected to a preliminary polymerization while maintaining the reaction system in a water-in-oil (W/O) type dispersion state. When the polymerization conversion in the preliminary polymerization reaches about 10 to 60% by weight (based on the weight of the monomer) the reaction system is inverted into an oil-in-water (O/W) type dispersion state whereupon the polymerization is completed under the usual suspension polymerization conditions.

In other words, in order to overcome the difficulties and problems of the suspension polymerization procedure or the two-step polymerization procedure in which a preliminary bulk polymerization is carried out prior to the suspension polymerization, in accordance with the process of this invention the first stage polymerization is carried out in a water-in-oil type dispersion state, whereby the reaction temperature can be properly controlled because of the improved heat transfer from reaction mixture and the viscosity of the whole system can be maintained such that the system can be sufficiently agitated by means of a conventional agitation system, which results in improving the reproducibility of the reaction and making possible the formation of a sufficiently homogeneous polymer composition. Further, since a conventional well-known suspension polymerization process is carried out as the last step in the process of this invention, the polymer product can be recovered in the form of fine beads which can be handled easily.

As the aromatic monoalkenyl monomer to be used in the process of this invention, styrene is most suitable but various nuclear-substituted styrene derivatives and mixtures thereof with styrene may be used. As the monovinyl monomer to be used together with the aromatic monoalkenyl monomer in the process of this invention, acrylonitrile, acrylic ester and methacrylic ester are suitable. However, the monovinyl monomer in this invention is not limited to the above-named monomers and one or more polymerizable compounds having >C=C< group may be employed in the process of this invention.

As the rubber elastomer to be employed in the process of this invention, those generally used for the production of impact resistant polymers, such as various synthetic rubbers mainly consisting of butadiene or chloroprene may be suitably used, but in particular polybutadiene (trade name "Diene Rubber") or the butadiene-styrene copolymer (trade name "Stereon" and "Duradene Rubber") having a comparatively high steric regularity and prepared by a solution polymerization using a catalyst mainly consisting of lithium are more advantageous.

There are no specific limitations on the mixing ratio of the monomer and the rubber elastomer, but in general, a ratio of about 2 to about 40 parts by weight of the rubber elastomer to 100 parts by weight of the aromatic monoalkenyl monomer or a mixture of the aromatic monoalkenyl monomer and the polymerizing monovinyl monomer is preferred.

As a dispersing agent to be used for providing the water-in-oil type dispersion in the process of this invention there may be employed metallic soaps, such as magnesium stearate, calcium stearate and zinc stearate, or nonionic surface active agents having a HLB value of less than 10, such as polyethylene glycol, polyethylene glycol- or sorbitan monoester, and monoether. As a dispersing agent for providing the oil-in-water type dispersion, there may be employed the usual inorganic dispersing agents such as magnesium hydroxide, basic magnesium carbonate, tri-calcium phosphate, and barium sulfate or water-soluble high molecular weight materials such as polyvinyl alcohol, sodium polyacrylate and gelatin, etc. Surprisingly, the inversion of the aqueous dispersion from the water-in-oil type into the oil-in-water type can be very smoothly conducted and no troubles occur if the proportions of the both types of dispersing agents are properly selected.

The proportions of the dispersing agent shall be suitably selected depending on the kinds of dispersing agents used, the mixing ratio of the monomer to the rubber elastomer, and the polymerization temperature to be employed. So, it is difficult to indicate here the proportions but, for example, in the case of using the metal salt of stearic acid or polyethylene glycol monoester as the water-in-oil type dispersing agent, a ratio of 0.01 to 0.5 part by weight of said dispersing agent to 100 parts by weight of the monomer phase is suitable, and in the case of using inorganic dispersing agent such as calcium phosphate or magnesium hydroxide as the oil-in-water type dispersing agent, a ratio of 1 to 5 parts by weight of said dispersing agent to 100 parts by weight of the monomer phase is suitable.

Further, there are also no specific limitations about the polymerization catalysts to be used in the polymerization process of the present invention and the usual radical polymerization catalysts, such as organic peroxides or azo compounds, may be used if necessary. The polymerization temperature in the process of this invention may be properly selected dependent at least in part on the kind of polymerization catalyst to be employed and, in general, the temperature may be 50 to 150° C., preferably 70 to 120° C.

Moreover, in the process of this invention, such additives as a chain transfer agent, a plasticizer, an internal lubricant, and a dispersion aid may of course be added in the reaction system.

The following examples are intended to illustrate the present invention but not to limit it in any away.

Example 1

Into a stainless steel autoclave (1 liter) having an electromagnetic stirrer were charged 200 ml. of deionized water, 0.1 g. of zinc stearate, and 300 g. of styrene monomer containing 24.3 g. of Diene Rubber NF 35A (polybutadiene containing 35% of 1.4-cis unit, made by Firestone Tire and Rubber Co.), 0.6 g. of dibenzoyl peroxide, 0.3 ml. of ditertiary butyl peroxide, and 0.11 ml. of tertiary dodecylmercaptan in solution, under constant agitation. After replacing the air therein with nitrogen, the autoclave was closed, and the reaction mixture was polymerized in the form of water-in-oil dispersion with the agitation being carried out at about 800 r.p.m., and the temperature being kept at 90° C. for two hours. Thereafter, the system was inverted to form an oil-in-water type dispersion phase by adding to the aqueous dispersion 13.5 g. of magnesium hydroxide, and the system was heated to 120° C. for 8.5 hours to complete the polymerization under constant agitation. After cooling, the system was acidified with hydrochloric acid to dissolve and remove magnesium hydroxide, and washed with water repeatedly. The thus formed polymer was separated by filtration and dried. The polymer was molded into pellets by a small extruding machine and then the pellets were injection molded to form an article in the shape of a plate of 5 x 5 sq. cm. in area and 2 mm. in thickness. A plate having very excellent surface gloss was obtained. That is, the surface reflection percentage by the incident light at a 60° angle was 60%. A dumbbell shaped test sample molded therewith had a tensile strength of 328 kg./sq. cm. and an elongation of 26.5%.

Example 2

A polymerization was carried out using the same apparatus as in Example 1 and under the same conditions as in the above example except that 0.3 g. of the surface active agent "Nonion S–2" (polyethylene glycol monostearate made by Nippon Oil & Fats Co.) instead of zinc stearate and 0.3 g. of a defoaming agent "KM 68–IF" (mainly consisting of polydimethyl siloxane made by Shinetsu Kagaku K.K.) was added together with magnesium hydroxide in the second step.

When the thus obtained polymer was extruded by means of a small extruding machine, the moldability of the polymer was good and an article showing a high gloss was molded.

Example 3

Into the same apparatus as in Example 1 were charged a solution of 0.3 g. of "Nonion S–2" in 200 ml. of deionized water, and a solution of 207 g. of styrene and 93 g. of acrylonitrile containing 15 g. of "Duradene Rubber" (a butadiene-styrene copolymer rubber using a lithium catalyst; made by Firestone Tire and Rubber Co.), 0.33 g. of dibenzolyl peroxide, 0.24 g. of dicumyl peroxide, 0.60 g. of tertiary dodecylmercaptan, and 3.0 g. of butyl stearate, under constant agitation. After replacing the atmosphere therein with nitrogen, the system was heated to 80° C. for three hours with the agitation of about 800 r.p.m., and then, after adding an aqueous suspension of 13.5 g. of magnesium hydroxide and 0.3 g. of a defoaming agent "KM 68–IF" in 200 ml., of deionized water, the system was further heated to 120° C. for six hours under agitation. The thus obtained polymer was washed and dried as usual and then subjected to the same molding test as described in Example 1. The molded article showed a high surface gloss and had a tensile strength of 540 kg./sq. cm. and an elongation of 25%.

In contrast to this, a molded article of the polymer having the similar composition which was prepared in a conventional one-step suspension polymerization had low gloss and had a tensile strength of 616 kg./sq. cm. and an elongation of 13%, which shows that the article was relatively brittle property.

Although a particular preferred embodiment of the invention has been disclosed above in detail for illustrative purposes, it will be recognized that variations or modifications of such disclosure, which come within the scope of the appended claims, are fully contemplated.

The embodiments of the invention in which an exclusive property or privilege is claimed are defined as follows:

1. In a process for the production of a high impact polymer by forming an interpolymer from a system prepared by dissolving or mixing (A) a rubbery conjugated 1,3-diene polymer in (B) a polymerizable monomer selected from the group consisting of (1) an aromatic monoalkenyl hydrocarbon monomer and (2) a mixture of an aromatic monoalkenyl hydrocarbon monomer and a polymerizable monovinyl monomer selected from the group consisting of acrylonitrile, acrylic esters and methacrylic esters, in a ratio of 2 to 40 parts by weight of the rubbery conjugated 1,3-diene polymer to 100 parts by weight of the polymerizable monomer, the improvement which comprises:

agitating and heating a mixture of said system with water and a dispersion agent to form a water-in-oil dispersion and to carry out a preliminary polymerization thereof while maintaining said mixture in the water-in-oil dispersion state until the polymerization percentage reaches from about 10 to about 60 percent by weight, based on the weight of the monomer; then adding a suspension agent to said partially polymerized mixture to invert said mixture into an oil-in-water dispersion and then continuing to heat and agitate said partially polymerized mixture while maintaining same in the oil-in-water dispersion state until the polymerization is substantially completed in order to obtain the polymer in granular form.

2. The process according to claim 1 wherein said aromatic monoalkenyl hydrocarbon monomer is selected from the group consisting of styrene, a styrene derivative and mixtures therof.

3. The process according to claim 1, wherein said 1,3-diene polymer is selected from the group consisting of a polybutadiene rubber and a butadiene-styrene copolymer rubber.

4. The process according to claim 1 wherein said dispersion agent is selected from the group consisting of magnesium stearate, calcium stearate, zinc stearate, polyethylene glycol, polyethylene glycol sorbitan monoester and polyethylene glycol sorbitan monoether.

5. The process according to claim 1 wherein said suspension agent is selected from the group consisting of magnesium hydroxide, basic magnesium carbonate, calcium phosphate, barium sulfate, polyvinyl alcohol, sodium polyacrylate and gelatin.

6. The process according to claim 1 wherein said polymerization is carried out in the presence of a radical polymerization catalyst at a polymerization temperature of about 50 to 150° C.

References Cited
UNITED STATES PATENTS

| | | | |
|---|---|---|---|
| 2,886,553 | 5/1959 | Stein et al. | 260—880 |
| 3,244,772 | 4/1966 | Bonin et al. | 260—861 |
| 3,255,127 | 6/1966 | Bonin et al. | |
| 3,256,219 | 6/1966 | Will. | |

MURRAY TILLMAN, Primary Examiner

K. E. KUFFNER, Assistant Examiner

U.S. Cl. X.R.

260—29.6